United States Patent
Baldaccini (10) Patent No.: US 10,576,550 B2
(45) Date of Patent: Mar. 3, 2020

(54) TURRET FOR TOOL MACHINE

(71) Applicant: MARIO BALDACCINI, MECCANICA DI PRECISIONE, Caslano (CH)

(72) Inventor: Stefano Baldaccini, Caslano (CH)

(73) Assignee: MARIO BALDACCINI, MECCANICA DI PRECISIONE, Caslano (CH)

( * ) Notice: Subject to any disclaimer, the term of this patent is extended or adjusted under 35 U.S.C. 154(b) by 286 days.

(21) Appl. No.: 14/901,944

(22) PCT Filed: Jul. 7, 2014

(86) PCT No.: PCT/IB2014/001282
§ 371 (c)(1),
(2) Date: Dec. 29, 2015

(87) PCT Pub. No.: WO2015/008124
PCT Pub. Date: Jan. 22, 2015

(65) Prior Publication Data
US 2017/0014965 A1    Jan. 19, 2017

(30) Foreign Application Priority Data
Jul. 16, 2013  (IT) .............................. RM2013A0419

(51) Int. Cl.
*B23B 29/24*   (2006.01)
*B23B 29/34*   (2006.01)
(Continued)

(52) U.S. Cl.
CPC ............ *B23B 29/242* (2013.01); *B23B 29/34* (2013.01); *B23B 31/207* (2013.01);
(Continued)

(58) Field of Classification Search
CPC ..... B23B 29/24–29/34; B23B 31/201–31/208; B23B 31/24–31/268;
(Continued)

(56) References Cited

U.S. PATENT DOCUMENTS 4,090,281 A * 5/1978 Hautau .................. B23B 39/205
                                                              29/40
5,730,691 A * 3/1998 Tokura .................. B23Q 1/0018
                                                              29/40
(Continued)

FOREIGN PATENT DOCUMENTS

DE           39 08 586 A1    9/1990
DE   10 2005 033 890 A1    1/2007
(Continued)

OTHER PUBLICATIONS

Machine Translation of EP 2666586 A1, which EP '586 was published Nov. 2013.*
(Continued)

*Primary Examiner* — Erica E Cadugan
(74) *Attorney, Agent, or Firm* — Young & Thompson (57) ABSTRACT

A turret for tool machine includes:
 at least a turret body supported by the tool machine;
 at least a rotating drum supported by the turret body and supporting at least two tool holders upon which are mounted at least two rotating tools the rotating drum being mounted externally rotating around the turret body;
 at least an electrical spindle positioned in a recess inside the turret body; the electrical spindle extending itself around a vertical axis;
 the electrical spindle including a motor, a rotating shaft for the transmission of the movement associated to the motor and an engagement portion suitable for coupling to the tool holder;
(Continued)

each tool holder extending itself along a vertical axis;

the rotating drum being rotatably mounted around the turret body so as to rotate for aligning each tool holder with the engagement portion.

12 Claims, 5 Drawing Sheets

(51) Int. Cl.
  *B23Q 5/10* (2006.01)
  *B23Q 3/157* (2006.01)
  *B23B 31/20* (2006.01)

(52) U.S. Cl.
  CPC ........... *B23Q 3/15706* (2013.01); *B23Q 5/10* (2013.01); *B23Q 2220/002* (2013.01); *Y10T 29/5155* (2015.01); *Y10T 409/309464* (2015.01); *Y10T 483/1795* (2015.01)

(58) Field of Classification Search
  CPC .............. B23B 31/42; B23Q 2220/002; B23Q 3/15706; B23Q 2003/15586; Y10T 29/5152–29/5167; Y10T 82/2587; Y10T 408/37; Y10T 483/179–483/1798; Y10T 409/309464
  USPC ....... 29/40, 35.5–48.5 A; 483/54–57, 24–25; 408/35; 82/159
  See application file for complete search history.

(56) References Cited

U.S. PATENT DOCUMENTS

| | | | | |
|---|---|---|---|---|
| 5,782,593 A | * | 7/1998 | Klement | B23Q 1/70 408/124 |
| 6,925,694 B2 | * | 8/2005 | Sauter | B23Q 39/02 29/39 |
| 7,137,180 B2 | * | 11/2006 | Matsumoto | B23Q 1/5406 29/40 |
| 7,150,085 B2 | * | 12/2006 | Ishiguro | B23Q 39/02 29/39 |
| 9,358,652 B2 | * | 6/2016 | Stiefel | B23B 29/32 |
| 2004/0103510 A1 | | 6/2004 | Sauter et al. | |
| 2010/0029451 A1 | * | 2/2010 | Sahm | B23Q 5/04 29/40 |
| 2014/0148320 A1 | * | 5/2014 | Baldaccini | B23Q 3/15706 483/1 |

FOREIGN PATENT DOCUMENTS

| | | | |
|---|---|---|---|
| DE | 10 2010 021 948 A1 | | 12/2011 |
| DE | 102016119778 A1 | * | 4/2018 |
| EP | 1 642 676 A1 | | 4/2006 |
| EP | 2666585 A1 | * | 11/2013 |
| EP | 2666586 A1 | * | 11/2013 |
| JP | 2003-251505 A | | 9/2003 |
| JP | 2006-326768 A | * | 12/2006 |

OTHER PUBLICATIONS

International Search Report, dated Oct. 14, 2014, from corresponding PCT Application.

\* cited by examiner

Fig. 5

TURRET FOR TOOL MACHINE

FIELD OF THE INVENTION

The present invention refers to the field of tool machine and particularly to a turret, suitable for being used on tool machines in general, such as lathes, work centers, milling machines and so on for permitting the mounting of at least one rotating tool, and its rotation in order to process a piece on the tool machine.

BACKGROUND ART

Some tool machines, for example, the lathes, have a turret for the mounting of one or more rotating tools, the rotating tools are controlled by an actuating motor in such a way as to process a piece on the tool machine.

In some known lathes, the turret has a turning block mounted on a fixed head of it, and a plurality of tools, chosen among rotating tools and other processing tools, radially supported on the turning block.

When the turning block is rotated around its axis, one of the supported instruments (for example, a rotating tool) is moved to the processing position, at this point the motor is moved in such a way as to actuate the turning tool and rotate it around its axis in such a way as to process the piece on the machine.

The actuating power or the actuating motor torque are transmitted to the rotating tool by a power transmission body such as for example a belt, conical gears and bearings.

The document US2004/0103510 describes a turret of the aforementioned type provided with an actuating motor positioned in a rotating drum. The actuating motor is directly connected to the rotating tool mounted on the turret in such a way as to rotate it through a coupling mechanism (in other words, the power is transmitted by means of a mechanical group of power transmission).

The patent application JP2003-251505, describes instead a turret for a lathe suitable for transmitting the driving power from an actuating motor to a rotating tool mounted on the turret. The power is transmitted through a transmission group comprising conical gears and bearings. The turret comprises a hollow rotating drum which houses within it the transmission group.

The Applicant has noted that in turrets for lathes of conventional type, such as the one described in JP2003-251505, the actuating motor is positioned in a considerably distant position with respect to the rotating tool, consequently the mechanical group of transmission for transmitting the movement from the motor to the rotating tool must necessarily have a complex structure.

The Applicant has further noted that as of today the movement of tools mounted to on turrets for lathes takes place with belt transmissions and gears. In other words, tools are mounted on devices completely independent from the actuating motor. For the rotation of tool, these devices are coupled to the actuating motor with belt transmission, gears or through special joints.

These transmission systems negatively affect processing precisions, are very is complex and still do not proof to be particularly efficient and quick.

The document DE 39 08 586 A1 shows a turret for tool machine wherein a tool holder is indirectly actuated by an electrical spindle by means of an indirect engagement. In details, although this document does not show the presence of belt or gear actuating means, it shows anyway the presence of a friction discoidal joint, interposed between the electrical spindle and the tool holder. In said friction discoidal joint is introduced a plurality of tips of a pair of pins which come out from the electrical spindle itself. The Applicant has noted that also the solution shown in the German document is characterized by the drawback that the joint negatively affects the processing precisions and complicates the realization of the machine, particularly making critical the transmission of high torques and the works at high speeds.

As a matter of fact, the engagement of the discoidal joint takes place thanks to a pair of pins which come out from the shaft of the electrical spindle, which engage on respective recesses in the joint itself. The pins are thin and thus subject to the fracture risk. Furthermore, the movement transmission takes place by means of a joint which is non coaxial with the rotation axis of the electrical spindle; this weakens the coupling because in case of clearances between the pins and the diameter of the spins themselves, the high distance from the rotation center creates not negligible reciprocal angular rotations between the pin and the joint, capable also of breaking the pin itself.

From the document DE10 2005 033 890 is known a turret for tool machines wherein the movement transfer between the motor shaft and the tool holder takes place with an intermediate joint interposed between the tool holder and the shaft itself, once more with an indirect engagement. In this last document, the motor is fixed and it cannot move axially. This makes the coupling change between the shaft of the electrical spindle and the tool holder more complicated.

The same configuration can also be found in document EP 1642 676, characterized by a transfer of rotation movement between the rotating shaft of the electrical spindle and the tool holder by means of a joint interposed between them too, also in this case realizing an indirect mechanical engagement.

In addition, in all the documents above described, the tool holders are solidly connected with the support which turns with respect to the spindle. Consequently, during the working phase, the various working forces are supported by the tool holders which turn on bearing which are in turn constrained to the support and clipped to the wheel.

The electrical spindle, transmits then only the rotating movement to the various tool holders with various transmission systems.

With this system, the zero point of each tool will not always be the same: it depends on the precision of production of the wheel itself, such as distances and angular divisions, particularly if the offset of the effective coupling between the shaft of the spindle and the pins becomes more and more accentuated.

With this system, the angular position of the tool cannot be controlled.

Therefore, the Applicant has found the need for providing a turret for tool machines capable of solving the drawbacks of the background art.

The Applicant has noted that the problems above described can be solved with a turret wherein the actuation of the rotating tool takes place directly, without the interposition of mechanical transmissions between the actuating motor and the tool.

SUMMARY OF THE INVENTION

Thus, the invention firstly refers to a turret for machine tool adapted to hold at least one rotating tool for turning it a motor a piece on the tool machine;

said turret comprising:
at least a turret body supported by the tool machine;
a least a rotating drum supported by said turret body and supporting at least two tool holders upon which are mounted at least two rotating tools said rotating drum being mounted externally rotating around said turret body;
at least an electrical spindle positioned in a recess inside the turret body;
said electrical spindle extending itself around a vertical axis Y-Y;
said electrical spindle comprising a motor, a rotating shaft for the transmission of the movement associated to said motor and an engagement portion suitable for coupling to said tool holder;
each tool holder extending itself along a vertical axis;
the rotating drum being rotatably mounted around said turret body in such a way as to rotate for aligning each tool holder with said engagement portion.

said turret being characterized in that said tool is actuated in rotation by said rotating shaft through a direct physical coupling wherein an engagement ending portion of said rotating shaft is directly engaged with said tool holder.

Preferably, said direct engagement takes place in correspondence with a central recess or cavity of said tool holder. The present invention, in this aspect, can show at least one of the preferred characteristics which are hereinafter described. In the context of the present invention, as electrical spindle is intended a spindle equipped with integrated internal motor suitable for rotating the shaft of the electrical spindle.

Preferably, the ending portion of engagement of said rotating shaft with said tool holder shows an its own axis coincident with the rotation axis of said tool holder and realizes a direct coaxial engagement between said tool holder and said shaft of said electrical spindle.

Preferably, said direct coaxial coupling is characterized in that said ending portion of engagement of said rotating shaft is detachably inserted within said central recess or cavity.

Preferably, the turret comprises at least a translation group for vertically translating along the axis Y-Y said electrical spindle between a working position wherein at least a portion of said tool holder is engaged to said engagement portion and permits the rotation of the tool at a position of tool change wherein said tool holder is disengaged from the engagement portion.

Advantageously, the rotating drum comprises a plurality of tool holders mounted along an its own circumference and angularly spaced.

Preferably, the translation group comprises at least a cylinder suitable for moving said electrical spindle in translation along the axis Y-Y.

Conveniently, the rotating drum comprises a plurality of fixing elements of tool holders to said drum and a plurality of blocking devices of tool holders.

Advantageously, each blocking element comprises at least an element of engagement with the tool holder, at least an elastic element for pushing said engagement element into engagement with said tool holder, at least a counter element for said elastic element and a release device of the engagement of said element of engagement with said tool holder.

Preferably, each tool holder comprises a seat suitable for housing a cylindrical plier of said rotating shaft.

In a second aspect, the present invention refers to a process for the change of tools of a turret for a tool machine as previously described comprising the phases of:

a) releasing the tool holder from the engagement portion of the electrical spindle;
b) raising said electrical spindle in such a way as to the cylindrical portion comes out from the contact with the tool holder;
c) engaging said engagement elements with the tool holder;
d) continuing the movement of raising said electrical spindle until pulling out the tool holder from said engagement portion;
e) turning said rotating drum for bringing a second tool holder in alignment with said engagement portion of the electrical spindle;
f) lowering the electrical spindle until inserting at least partially said tool holder in said engagement portion;
g) disengaging said elements of engagement with the tool holder;
h) engaging the tool holder in the engagement portion.

SHORT DESCRIPTION OF FIGURES

Other characteristics and advantages of the invention will be clearer form the detailed description of some preferred forms of embodiment, but not exclusive, of an electrical spindle device and of a process for the change of tool with said electrical spindle device according to the present invention.

This description will be hereinafter shown with reference to the attached figures, provided for indicative purposes only and not limiting, wherein.

DETAILED DESCRIPTION OF THE FORMS OF EMBODIMENT OF THE INVENTION

Figure 1:
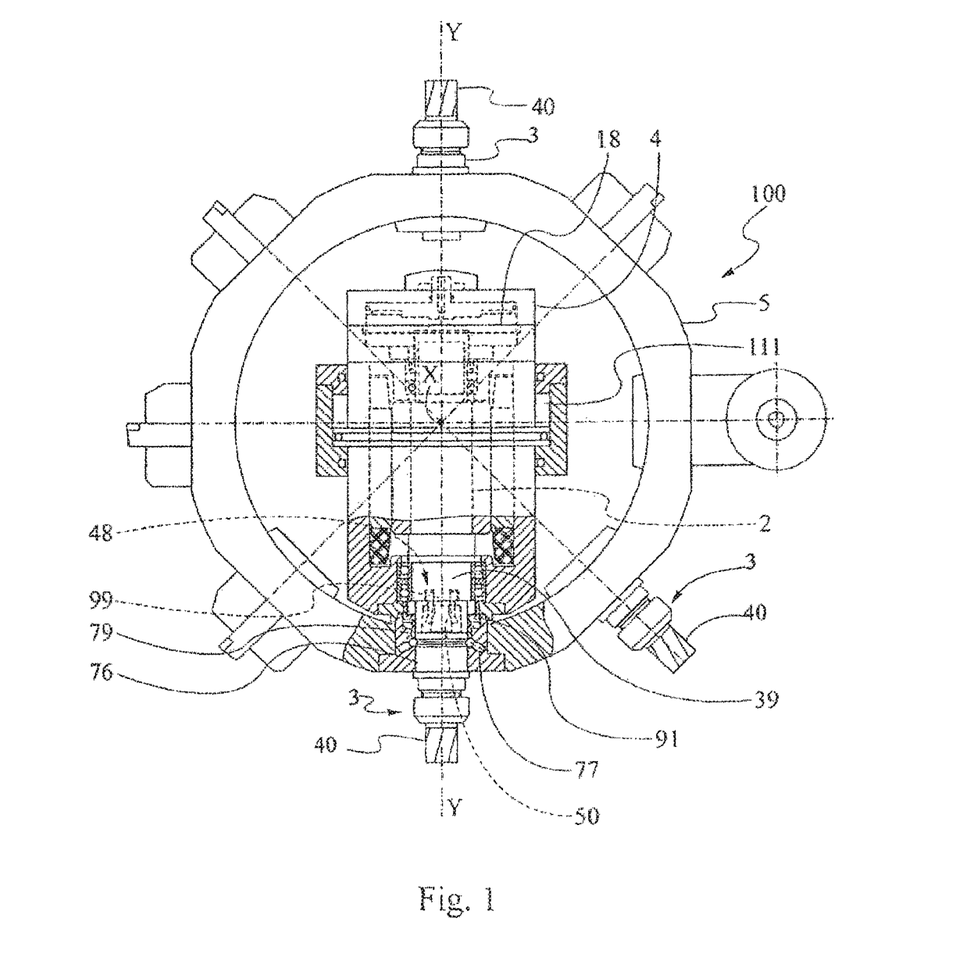
FIG. 1 is a partially front cross sectional view of a turret for lathes according to the present invention.
Figure 2:
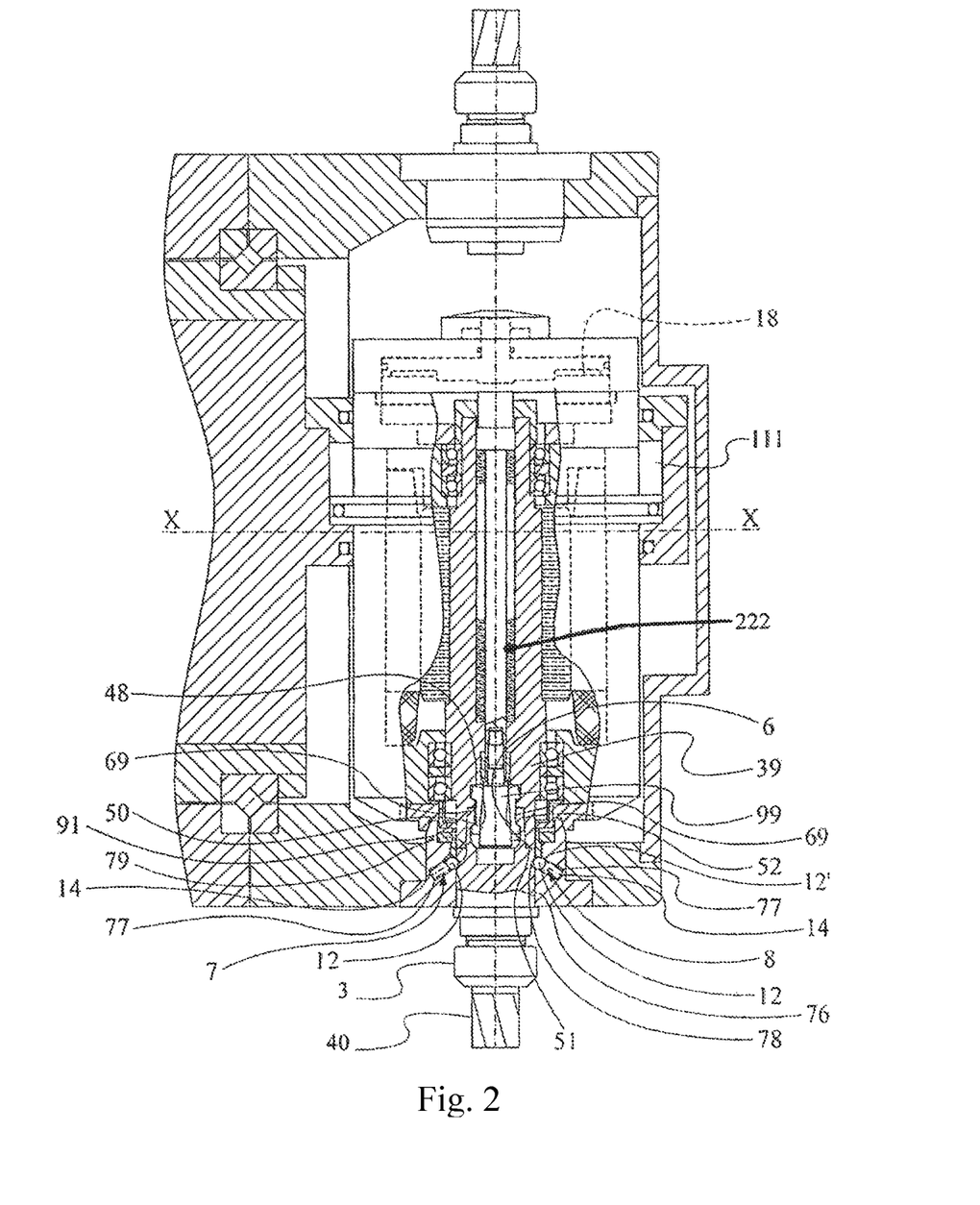
FIG. 2 is a cross view in lateral section of a portion of the turret of FIG. 1, with the engagement portion engaged with the tool holder.
Figure 3:
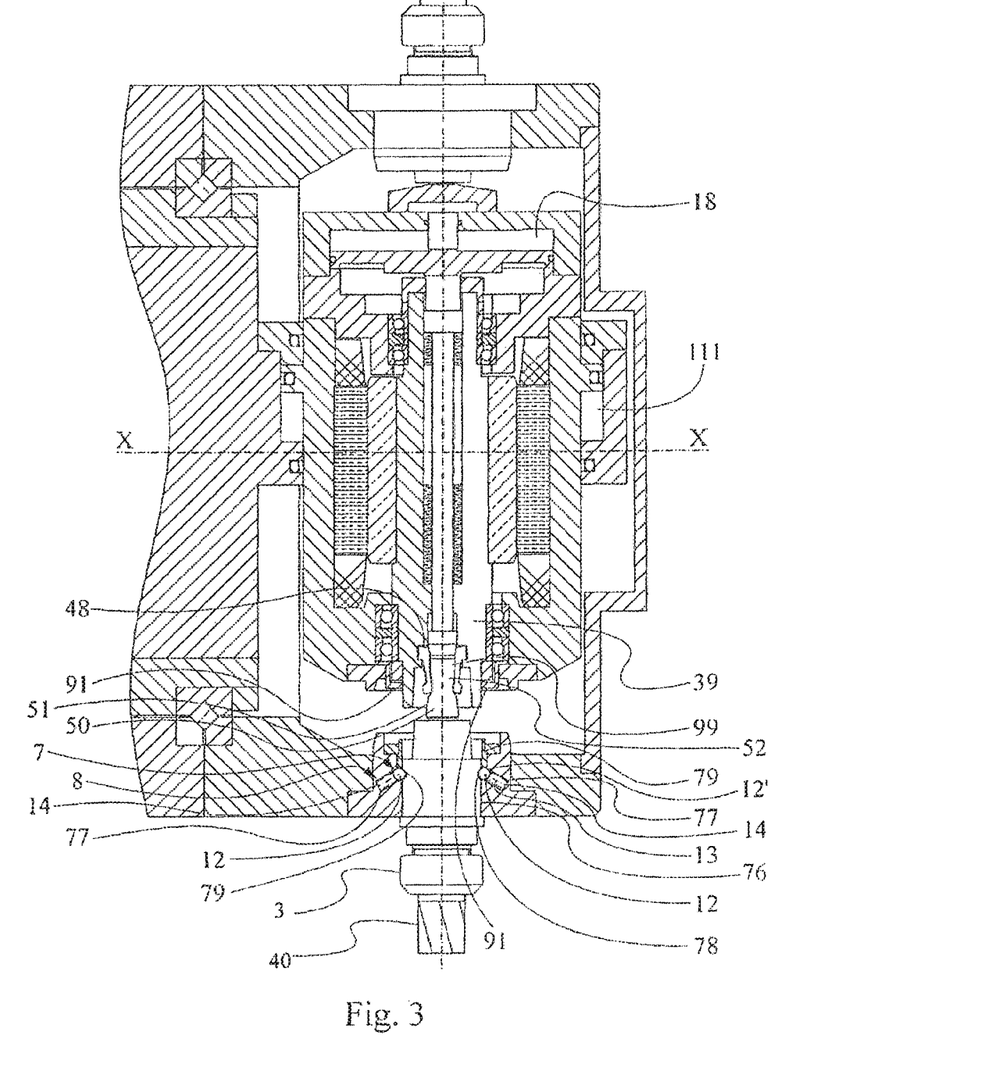
FIG. 3 is a cross view in lateral section of a portion of the turret of FIG. 1, with the engagement portion disengaged from the tool holder.

With reference to FIGS. 1-3, a turret for a tool machine according to the present invention, is identified with number reference 100.

The turret 100 is designed for mounting at least one rotating tool and for rotating it in order to permit the processing of a piece on the tool machine.

The turret 100 shows at least a fixed turret body, supported by tool machine and at least a rotating drum 5 rotatably supported by the turret body 4.

The rotating drum 5 rotates around an axis X-X, indicated in FIG. 1, orthogonal to and coming out from the sheet, externally around the turret body 4.

The rotating drum 5 supports, radially arranged around its external periphery a plurality of tool holder 3.

In other words, the tool holders 3 are arranged along an external circumference of the rotating drum 5.

Upon each tool holder 3 is mounted a rotating tool 40.

Internally to the fixed turret body 4 is at least present an electrical spindle 2 positioned in a suitable cavity.

The electrical spindles are electro-mechanical components designed for works of drilling, milling, blading, tapping, engraving, boring, adjustment and turning.

The electrical spindle 2 as better shown in FIG. 1 extends itself around a vertical axis Y-Y, orthogonal to the rotation axis X-X of the rotating drum 5.

The electrical spindle 2 shows a motor, a rotating shaft 39 which transmits the rotating movement to the tool 40.

The rotating shaft 39 is associated to the motor and has in correspondence with its free ending, that is the opposite to the motor, an engagement portion 6.

The engagement portion 6 shows itself as a conical seat suitable for housing a corresponding conical portion of a tool holder 3.

As previously anticipated, the rotating drum 5 is rotatably mounted around the rotation axis X-X in such a way as to rotate for moving a tool holder 3 and consequently its tool 40 in alignment with the engagement portion 6 of the electrical spindle 2, internally arranged in the turret body 4.

In the conical seat of the engagement portion 6 is, then, housed a tool blocking device 48 of a tool holder 3 for engaging and thanks to the electrical spindle 2 rotating the tool holder 3 and consequently the rotating tool 40 with the electrical spindle 2.

The tool blocking device 48 permits the direct engagement between the rotating shaft 39 of the electrical spindle 2 and the tool 40 through the tool holder 3. In other words, with the term "direct engagement" is intended according to the present invention that between the rotating shaft 39 and the tool holder 3 no mechanical group of movement transmission is interposed thereto. In other words, an ending portion or ending of the rotation shaft 39 of the electrical spindle 2 is axially introduced in the rotating body of the tool holder 3, engaging itself with an its substantially conical portion. The engagement portion shows thus an its own axis coinciding with the rotation axis of the tool holder. In the attached figures, the direct mechanical engagement between the rotation shaft of the electrical spindle and the tool holder 3 takes place by means of penetration of the first inside a central recess of the second, but the situation can be alternatively inverted.

Anyway, this permits to eliminate the angular rotations which can be created in case of presence of clearance between the electrical spindle 2 and the tool holder 3.

Through the direct engagement as described in the present invention, the work zero point of all the tools on the rotating drum 5 will be always the same, because each tool holder during the working phase is directly engaged with the rotation shaft 39 of the electrical spindle 2. Differently from what happens for the background art, in the turret object of the present invention is the shaft of the electrical spindle to be mounted on bearings in such a way as to support the torque force.

In other words, in the turret object of the present invention, the rotating drum 5 is used only for transporting the tools in position ready for the engagement to the electrical spindle. This advantageously contributes to improve the coupling precision between the shaft of the electrical spindle 2 and the tool holder 3. Another advantage of the invention is that with the shaft of the electrical spindle 15 integral with the tool holder, the rotation of the tool is under control, that is the exact angular position of the tool under process can be controlled. Through encoders, angular displacements until 3 degree seconds can be controlled. With this system threading can be made.

The background art with clearances which are among the various couplings between the spindle and the tool holder do not permit to do so.

Advantageously, furthermore, the coaxial direct engagement with the rotation axis of the electrical spindle is intrinsically strong and permits to manage torques also of noticeable strength.

As a matter of fact, integrally with the head ending of a rod 99 in the rotation shaft 39 of the electrical spindle 2 is provided a cylindrical plier 50 whereas the corresponding conical portion of the tool holder 3 shows a section shrinking 69.

The cylindrical plier 50 is provided with of a plurality of cuts circumferentially arranged and oriented in direction of axis Y-Y. The head ending of the rod 99 can slide along axis Y-Y of said shaft 39 of the electrical spindle 2 with respect to the cylindrical plier 50 for determining the increase or reduction of the external diameter of it.

The head ending of the rod 99 of the electrical spindle 2 shows a conical external surface 51 and the cylindrical plier 50 a corresponding conical internal surface.

When the head ending of the rod 99 finds itself in an its own first upper or extended position toward the external of the turret, shown in FIG. 1-2, the external surface 52 of the cylindrical plier 50 is engaged with the section shrinking 69 blocking the tool holder 3 with respect to the shaft 39 of the electrical spindle 2 in such a way as to make a reciprocal sliding along axis Y-Y which can disengage the shaft of the electrical spindle from the tool holder 3 impossible; consequently the shaft 39 can thus rotate the tool holder 3 and the tool 40.

In contrast, when the head ending of the rod 99 itself in an its own second lower or retracted position toward the inner of the turret, shown in FIG. 3, the external surface 52 of the cylindrical plier 50 is not engaged with the section shrinking 69. In this situation, the cylindrical plier 50 is in a position with respect to the shaft 39 of the electrical spindle 2, and in particular its internal conical surface with respect to the one of the ending of the rod 99, such as to determine a diameter of the external surface 52 of the cylindrical plier 50 in order to permit the passage with respect to the section shrinking 69. In this way, the shaft 39 of the electrical spindle 2 can disengage with respect to the tool holder 3.

The rod 99 is actuated by a piston cylinder 18, upperly positioned with respect to the rod itself in the electrical spindle 2.

In the working position, shown in FIG. 1, 2, the rotating shaft 39 of the electrical spindle 2 is engaged with tool holder 3 and its rotation determines the rotation of the tool 40 brought by it.

The electrical spindle 2 can translate in vertical direction with respect to the turret body 4 and to the rotating drum 5, that is along a vertical direction found by axis Y-Y of the electrical spindle 2 itself.

In detail, the electrical spindle 2 can translate in vertical direction with respect to rotating drum 5, between a working position, wherein the tool 40 engaged through the tool holder 3 by the electrical spindle 2 works on a mechanical piece and a position of tool change wherein the electrical spindle 2 is raised in such a way as to not interfere with the rotating drum 5 which is then free to rotate for moving a tool holder 3 and consequently a tool 40 in coupling position with the rotating shaft 39.

The coupling between the rotating shaft 39 and the tool holder is direct, that is without the interposition of joints or chain transmissions or similar, which advantageously permit to obtain a higher precision of movement transmission between the rotating shaft 39 and the tool holder. Advantageously, furthermore, the direct joint between the shaft 39 of the electrical spindle and the tool holder 3 ensures working safety even in case of high rotation speeds, because the engagement portion of the ending part of the shaft 39 is central, substantially cylindrical and does not show portions sensibly extended along the axis Y-Y which can break during the rotations at high speeds.

For this purpose, the electrical spindle 2 shows a translation group comprising a pneumatic cylinder 111 suitable for moving the electrical spindle 2 in a vertical translation.

Alternatively, it can be provided a hydraulic cylinder without departing from the scope of protection of the present invention.

The rotating drum 5 comprises a plurality of blocking elements 7 of tool holders 3 to the drum itself and a plurality of blocking devices 8 of tool holders 3.

The fixing elements 7 comprise fixing seats 76 realized as flanges mounted in the rotating drum 5 suitable for housing at least a portion of a tool holder 3 and for keeping it blocked in position by means of suitable blocking elements 8.

Each blocking element 8 as better shown in FIGS. 1, 2 and 3 is positioned in a lateral blind seat 77 of the fixing seat 76, of the rotating drum 5 and comprises at least an element of engagement 12 with the tool holder 3, at least an elastic element 13 for pushing the element of engagement 12 in engagement with the tool holder 3 and at least a counter element 14 for the elastic element 13.

In the preferred form of embodiment shown in FIGS. 1, 2 and 3 the elastic element 13 is represented by an helical spring which pusher the element of engagement 12, represented by a sphere 12' against a cavity 78 realized on the external surface of the tool holder 3.

The counter element 14 is represented by the basis of a radial blind seat 77.

For each tool holder 3 are provided at least two blocking elements 8.

When the sphere 12' is engaged in the radial cavity 78 the tool holder 3 is kept blocked and integral with the rotating drum 5. In this situation, the tool holder is not engaged in the spindle. For releasing the tool holder 3 there is a releasing device of the element of engagement 12 with respect to said tool holder 3.

Advantageously, the releasing device comprises a cylindrical compass 79 mounted in such a way as to slide on said tool holder 3 in a direction parallel to axis Y-Y of the electrical spindle 2 and a cylindrical portion 91 integral with the electrical spindle 2 and suitable for stopping against the compass for causing its translation in a direction parallel to axis X-X of the electrical spindle 2, after the translation of the electrical spindle with respect to rotating drum 5.

When the cylindrical portion 91 stops against the compass 79 pushes it along a direction parallel to axis Y-Y downwards, the compass 79 in turn stops against the spheres 12' removing them from the radial cavity 78 and releasing the tool holder 3 from the rotating drum 5.

At this point the spindle is ready to block through the internal plier 50 the tool holder 3.

With the blocked tool the spindle can begin to turn.

The turret 100 for tool machine according to the present invention is suitable for carrying out different operations by inserting in the tool block 48 the tool holder 3 with the tool 40 most suitable; in particular, the tool 40 is selected through the rotating drum 5, rotatably mounted with respect to the fixed body 4 and to the electrical spindle 2.

For changing the tool, between an operation and the successive one, the following phases are carried out.

First of all, tool holder 3 is disengaged from the engagement portion 6 of the electrical spindle 2, in particular from the tool blocking device 48 thanks to a light sliding downwards of the head ending of the rod 99.

Sliding downwards, the rod 99 determines a reduction of the external diameter of the cylindrical plier 50 such as to permit the passage through the section shrinking 69 and consequently the disengagement of the tool holder 3 from the engagement portion 6.

The sliding downwards of the rod 99 is actuated by the piston cylinder 18.

The electrical spindle 2 is then raised such that the circumferential portion 91 is detached and does not stop anymore against the compass 79, this movement is instead actuated by the piston cylinder 111.

At this point, the engagement elements 12, represented by spheres 12' are engaged with the tool holder 3, in particular the spheres 12' are engaged through the springs 13 with the radial cavity 78 of the tool holder 3.

At this point, the actuation of the pneumatic cylinder 111 causes the translation of the electrical spindle upwards in a position such as to permit the free rotation of the rotating drum 5 with respect to the fixed body 4 without the interference of portions of the electrical spindle 2 with the tool holders 3.

The rotating drum 5 is then rotated for moving a second tool holder 3, which contains a second tool 40 to be used in the processing and in particular the tool blocking device 48 in alignment with the engagement portion 6 of the electrical spindle 2.

For engaging the second tool 40 is then lowered the electrical spindle 2, until the insertion of the engagement portion 6 with the tool holder 3 by the piston cylinder 111, such that the tool blocking device 48 can block the tool holder 3.

Previously, the lowering of the electrical spindle 2 through the actuation of the piston cylinder 18 it was taken action on the rod 99 reducing the cylindrical plier 50.

For blocking the tool holder 3 with the cylindrical plier 50 is actuated during the raising of the piston cylinder 18; in this way the shaft 39 of the electrical spindle 2 is integral with the tool 40 through the springs 222.

The turret 100 according to the present invention finds itself in the working position shown in FIG. 1, 2 and the tool 40 can carry out its processing, at the end of which if another process is requested, the above described process will be repeated.

Figure 4:
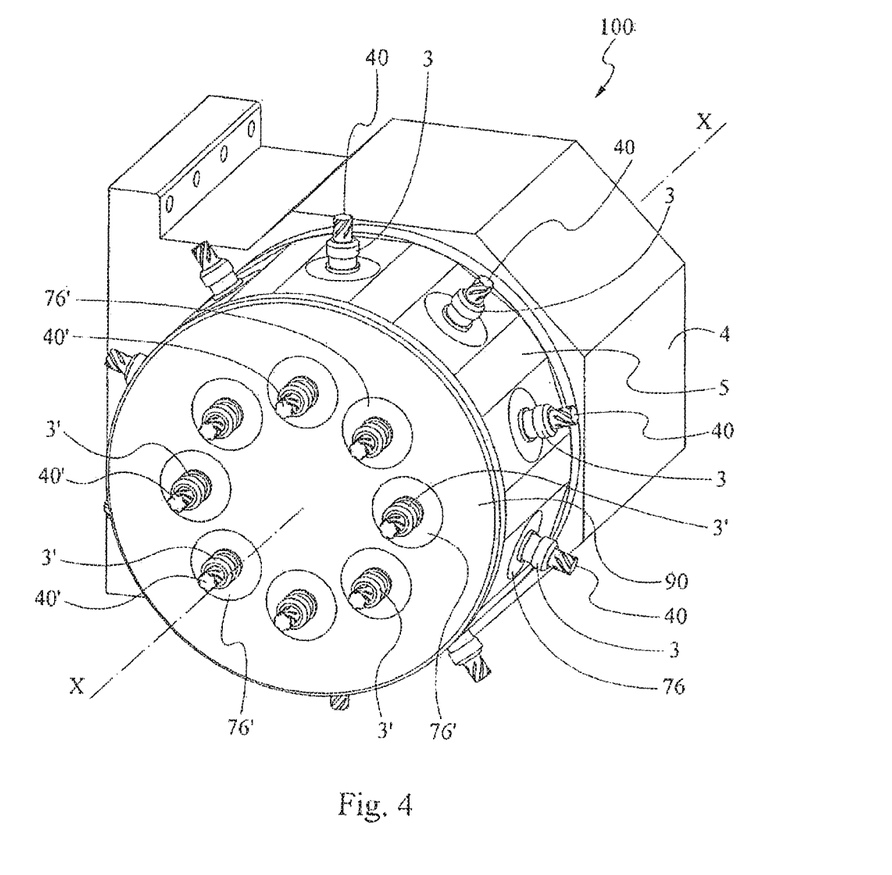
FIG. 4 is a perspective view of an alternative form of embodiment of the turret according to the present invention with two electrical spindles.
Figure 5:
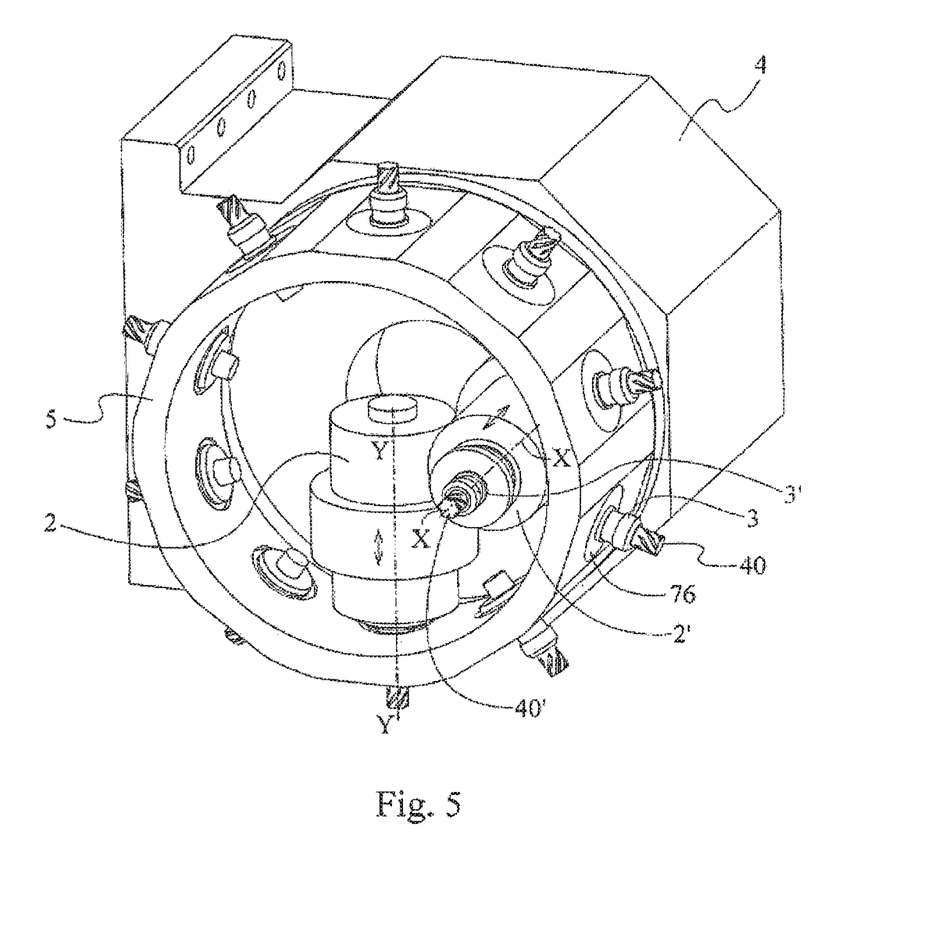
FIG. 5 is a perspective view of the turret of FIG. 4 with the rotating discoidal head detached.

In FIGS. 4 and 5 is shown an alternative form of embodiment of the turret 100 for tool machine according to the present invention.

The turret 100 is totally similar to the one of FIGS. 1-3 excepting for the fact that it has a second electrical spindle 2' and a second plurality of tool holder 3', each one provided with a rotating tool 40' suitable for being rotated by the electrical spindle 2'.

In details, the turret 100 shown in FIGS. 4 and 5 has a second electrical spindle 2' suitable for translating along axis X-X orthogonal to axis Y-Y of the first electrical spindle 2.

The electrical spindle 2' has a dedicated motor and a rotating shaft too which transmits the rotation movement to the tool 40'.

The rotating shaft is associated to the motor and has in correspondence with its free ending that is the one opposed to the motor an engagement portion.

The engagement portion is shown also in this case as in the form of embodiment of FIGS. 1-3 a conical seat suitable for housing a corresponding conical portion of a tool holder 3'.

The tool holders 3' are arranged along a circumference concentric to axis X-X on a rotating discoidal head 90 integral with the rotating drum 5 of the turret 100.

The discoidal head 90 can rotate around an axis parallel to axis X-X for moving a tool holder 3' and consequently its tool 40' in alignment with the engagement portion of the electrical spindle 2', arranged within the electrical spindle 2.

Also in this case in the conical seat of the engagement portion is, then, housed a tool blocking device of a tool holder 3' for engaging and thanks to the electrical spindle 2' for rotating the tool holder 3' and consequently the rotating tool 40' with the electrical spindle 2'.

The tool blocking device permits the engagement between the rotating shaft of the electrical spindle 2' and, through the tool holder 3', the tool 40'.

In other words, between the rotating shaft of the electrical spindle 2' and the tool holder 3' there is no mechanical group of transmission interposed.

For this purpose, integrally with the head ending of a rod inside the rotation shaft of the electrical spindle 2' is provided a cylindrical plier totally similar to the cylindrical plier 50 of the rotation shaft of the electrical spindle 2.

When the cylindrical plier is engaged and blocks the tool holder 3' the electrical spindle 2' can rotate the tool holder 3' and the tool 40'.

Viceversa, when the head ending of the inner rod disengages the cylindrical plier 50', this one finds itself in a position with respect to the shaft of the electrical spindle 2' such as to determine the disengagement of the shaft of the electrical spindle 2' with respect to tool holder 3'.

The inner rod is actuated by a piston cylinder not shown in figure positioned in the turret body 4.

In the working position, the rotating shaft of the electrical spindle 2' is engaged with a tool holder 3' and its rotation determines the rotation of the tool 40' moved by it.

The electrical spindle 2' can translate in horizontal direction along axis X-X with respect to turret body 4 and to the rotating drum 5, that is along a direction orthogonal to axis Y-Y of the electrical spindle 2.

In details, the electrical spindle 2' can translate in horizontal direction along axis X-X with respect to rotating drum 5, between a working position, wherein the tool 40' engaged through the tool holder 3' by the electrical spindle 2' works on a mechanical piece and a position of tool change in which the electrical spindle 2' is displaced along axis X-X, in a rear position, in such a way as to not interfere with the discoidal head 90 integral with the rotating drum 5 which is then free to rotate for moving a tool holder 3' and consequently a tool 40' in coupling position with the rotating shaft of the electrical spindle 2'.

The coupling between the rotating shaft of the electrical spindle 2' and the tool holder 3' is direct, that is without the interposition of transmissions.

For this purpose, the electrical spindle 2' has a translation group comprising a pneumatic or hydraulic cylinder suitable for horizontally translating the electrical spindle 2'.

The rotating discoidal head 90 integral with the rotating drum 5 comprises a plurality of blocking elements of tool holders 3' on the discoidal head itself and a plurality of blocking devices of tool holders 3'.

The fixing elements and the blocking devices are totally equal to the fixing elements 7 to the blocking devices 8 previously described for the form of embodiment shown in FIGS. 1-3 provided only with the electrical spindle 2.

In particular, the fixing means comprise fixing seats realized in fixing flanges 76' mounted on the rotating discoidal head 90 suitable for housing at least a portion of a tool holder 3' and for keeping it blocked in position by means of suitable blocking elements.

The present invention has been described with reference to some forms of embodiment. Various modifications can be done to the forms of embodiments described in details, still remaining in the field of protection of the invention, defined by the following claims.

The invention claimed is:

1. A turret (100), for a tool machine, for holding at least two rotating tools and for turning at least one of the at least two rotating tools for machining a piece at the tool machine, said turret comprising:

a turret body (4) configured to be supported by the tool machine;

a rotating drum (5) supported by said turret body (4) and supporting at least two tool holders (3) upon which are mounted the at least two rotating tools (40), said rotating drum (5) being externally rotatable around said turret body (4);

an electrical spindle (2) positioned in a recess inside the turret body (4), said electrical spindle (2) extending around a vertical axis (Y-Y), said electrical spindle (2) including a motor, a rotating shaft (39) for transmission of rotational movement of said motor, and an engagement portion (6) movable to couple to a corresponding one of the at least two tool holders (3), each of said tool holders (3) being positionable to extend along said vertical axis (Y-Y), the rotating drum (5) being rotatably mounted around said turret body (4) in such a way as to rotate so as to align one tool holder of said tool holders (3) with said engagement portion (6) to thereby establish an aligned tool holder (3) that is aligned with said engagement portion (6) so as to receive and engage with said engagement portion (6), wherein a mounted rotating tool (40) of said aligned tool holder is actuated in rotation by said rotating shaft (39) through a direct physical coupling with an engagement end portion of said rotating shaft (39) being directly engaged with said aligned tool holder (3) to thereby establish a direct engagement between the engagement end portion of said rotating shaft (39) and the aligned tool holder (3), wherein an end of said rotating shaft (39) has a rod (99) provided thereon, and a head end of the rod (99) has a cylindrical plier (50), wherein said head end of said rod (99) is slideable along a direction of the vertical axis (Y-Y) in relation to said cylindrical plier (50) in a manner that causes an outer diameter of said cylindrical plier (50) to change, and wherein each one of said tool holders (3) comprises a seat configured to house said cylindrical plier (50); and a translation group for vertically translating said electrical spindle (2) along the vertical axis (Y-Y), the translation group vertically translating said electrical spindle, including the motor, the rotating shaft (39), and the engagement portion (6), between:

i) a first working position wherein at least a portion of said aligned tool holder (3) is engaged with said engagement portion (6), and ii) a second tool change position where said aligned tool holder (3) is disengaged from the engagement portion (6).

2. The turret (100) according to claim 1, wherein said direct engagement between the engagement end portion of said rotating shaft (39) and said aligned tool holder (3) is a direct engagement with the engagement end portion of said rotating shaft (39) detachably inserted within a central recess of said aligned tool holder (3).

3. The turret (100) according to claim 2, wherein the direct engagement of said engagement end portion of said rotating shaft (39) with said aligned tool holder (3) results in a common rotation axis with said aligned tool holder (3).

4. The turret (100) according to claim 2, wherein the at least two tool holders (3) are mounted along a circumference of the rotating drum and are angularly spaced along the circumference of the rotating drum.

5. The turret (100) according to claim 1, wherein the direct engagement of said engagement end portion of said rotating shaft (39) with said aligned tool holder (3) results in a common rotation axis with said aligned tool holder (3).

6. The turret (100) according to claim 5, wherein the direct engagement of said engagement end portion of said rotating shaft (39) with said aligned tool holder (3) results in said engagement end portion of said rotating shaft being removably inserted in a central recess of said aligned tool holder (3).

7. The turret (100) according to claim 1, wherein the at least two tool holders (3) are mounted along a circumference of the rotating drum and are angularly spaced along the circumference of the rotating drum.

8. The turret (100) according to claim 1, wherein said translation group comprises a pneumatic cylinder for vertically translating the electrical spindle (2) along the vertical axis (Y-Y).

9. The turret (100) according to claim 1, further comprising:
a further electrical spindle (2') positioned in a cavity inside the turret body (4), said further electrical spindle (2') extending itself around a horizontal axis (X-X) substantially orthogonal to the vertical axis (Y-Y).

10. The turret (100) according to claim 9, further comprising:
a rotating discoidal head (90) integral with the rotating drum (5); and
a plurality of further tool holders (3') for mounting further rotating tools (40'),
wherein said further tool holders (3') are mounted on the rotating discoidal head (90),
wherein said rotating discoidal head (90) is rotatable around an axis parallel to said horizontal axis (X-X) for moving one of said further tool holders (3'), and consequently one of the further rotating tools (40') mounted on said one further tool holder (3'), in alignment with an engagement portion of the further electrical spindle (2').

11. The turret (100) according to claim 9, further comprising:
a plurality of further tool holders (3') for mounting further rotating tools (40'); and
another translation group, said another translation group configured to translate said further electrical spindle (2') between i) a working position of at least a portion of said further tool holders (3') and ii) a tool change position.

12. The turret (100) according to claim 1, wherein said translation group comprises a hydraulic cylinder for vertically translating the electrical spindle (2) along the vertical axis (Y-Y).

* * * * *